United States Patent
Cohen et al.

(10) Patent No.: US 9,621,282 B2
(45) Date of Patent: Apr. 11, 2017

(54) ACOUSTIC INFORMATION TRANSFER

(71) Applicant: Avaya Inc., Basking Ridge, NJ (US)

(72) Inventors: Azaria Cohen, Maale Levona (IL); Ori Modai, Ramat Hasharon (IL)

(73) Assignee: Avaya Inc., Basking Ridge, NJ (US)

( * ) Notice: Subject to any disclaimer, the term of this patent is extended or adjusted under 35 U.S.C. 154(b) by 56 days.

(21) Appl. No.: 14/324,442

(22) Filed: Jul. 7, 2014

(65) Prior Publication Data
US 2016/0006520 A1    Jan. 7, 2016

(51) Int. Cl.
H04L 27/00    (2006.01)
H04B 11/00    (2006.01)
H04B 1/06    (2006.01)

(52) U.S. Cl.
CPC .............. H04B 11/00 (2013.01); H04B 1/06 (2013.01)

(58) Field of Classification Search
CPC .... H04L 25/4902; H04B 11/00; H04B 14/026
USPC ......................................... 375/354, 295, 316
See application file for complete search history.

(56) References Cited

U.S. PATENT DOCUMENTS

2008/0112885 A1* 5/2008 Okunev ............ A61B 1/00016
                                                  424/9.1
2012/0283987 A1* 11/2012 Busking ................ G01S 13/825
                                                  702/159

OTHER PUBLICATIONS

Hursky, P.; Porter, M.B.; Rice, J.A.; McDonald, V.K., "Passive phase-conjugate signaling using pulse-position modulation," in Oceans, 2001. MTS/IEEE Conference and Exhibition , vol. 4, No., pp. 2244-2249 vol. 4, 2001.*

(Continued)

*Primary Examiner* — David S Huang

(57) ABSTRACT

Embodiments disclosed herein provide systems and methods for acoustically transferring information between systems. In a particular embodiment, a method provides identifying information for acoustic transfer and determining an amount of time corresponding to the information. The method further provides acoustically transmitting a signal at a first time and, upon the amount of time elapsing since the first time, acoustically transmitting the signal at a second time.

17 Claims, 7 Drawing Sheets

(56) References Cited

OTHER PUBLICATIONS

Sari, H.; Woodward, B., "Underwater acoustic voice communications using digital pulse position modulation," in Oceans '97. MTS/IEEE Conference Proceedings , vol. 2, No., pp. 870-874 vol. 2, Oct. 6-9, 1997.*
Bingsheng Zhang; Qin Zhan; Si Chen; Muyuan Li; Kui Ren; Cong Wang; Di Ma, "PriWhisper:Enabling Keyless Secure Acoustic Communication for Smartphones," in Internet of Things Journal, IEEE , vol. 1, No. 1, pp. 33-45, Feb. 2014.*
Nandakumar et al. "Dhwani : Secure Peer-to-Peer Acoustic NFC." Microsoft Research, India. Aug. 13, 2013.
Hellman, Rhona P. "Growth Rate of Loudness, Annoyance, and Noisiness as a Function of Tone Location within the Noise Spectrum." RP. J Acoust Soc. Am. vol. 75 No. 1; pp. 209-218. Jan. 1984.
Oxenham, Andrew J. and Christopher J. Plack. "Suppression and the Upward Spread of Masking." JJ. Acoust. Soc. Am, vol. 104, Issue 6, pp. 3500-3510. Dec. 1998.
Halevi, Tzipora and Nitesh Saxena. "Acoustic Eavesdropping Attacks on Constrained Wireless Device Pairing—Final." IEEE Transactions on Information Forensics and Security. vol. 8, Issue 3. pp. 563-577. Mar. 2013.
Salomons, Erik M. and Sabine A. Janssen. "Practical Ranges of Loudness Levels of Various Types of Environmental Noise, Including Traffic Noise, Aircraft Noise, and Industrial Noise." Int. J. Environ. Res. Public Health. Jun. 2011; 8(6): 1847-1864.Published online May 26, 2011.

* cited by examiner

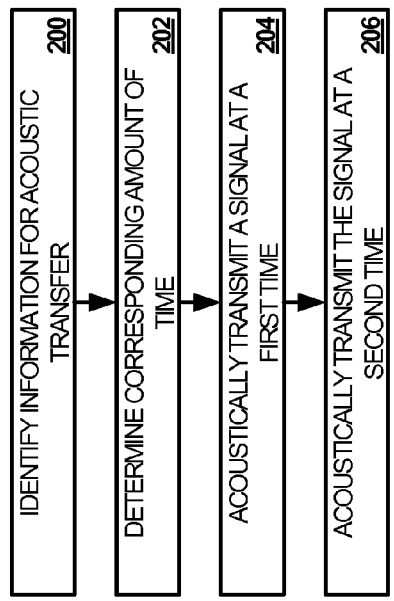
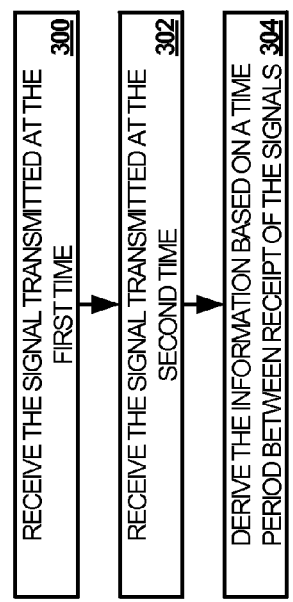

ACOUSTIC INFORMATION TRANSFER

TECHNICAL BACKGROUND

With the increased use of wireless devices, knowledge of one device's proximity to another has many applications. For example, a system may allow for wireless devices within its proximity to control aspects of the system. That system therefore needs a way to identify a device requesting control and ensure that device is close enough to the system to warrant granting control to the device.

Some common forms of communications between devices having close proximity are near field communications (NFC), Bluetooth, and infrared. In the example above, the system and the device would exchange information using one of these communication forms. The information exchanged would allow the system and the device to be aware of their proximity to each other, and set up a communication channel over communication networks, such as Ethernet, WIFI, or the Internet.

The common forms of close proximity communications each have their own drawbacks. For example, NFC requires proximity to be within a couple inches, Bluetooth requires a pairing procedure, and infrared required line of sight. Acoustic close proximity communications have been envisioned to overcome some of the above drawbacks. However, current acoustic methods are still subject to background acoustic noise interference and generate sounds that may be unpleasant to any person within earshot of the transmission.

Overview

Embodiments disclosed herein provide systems and methods for acoustically transferring information between systems. In a particular embodiment, a method provides identifying information for acoustic transfer and determining an amount of time corresponding to the information. The method further provides acoustically transmitting a signal at a first time and, upon the amount of time elapsing since the first time, acoustically transmitting the signal at a second time.

In some embodiments, the method provides receiving the signal transmitted at the first time and the signal transmitted at the second time and deriving the information based on a time period between receipt of the signal transmitted at the first time and receipt of the signal transmitted at the second time.

In some embodiments, the method provides that deriving the information based on a time period between receipt of the signal transmitted at the first time and receipt of the signal transmitted at the second time comprises determining a correlation between the signal transmitted at the first time and the signal transmitted at the second time, determining the time period as a time between peaks resulting from the correlation, and identifying the information that corresponds to the time period.

In some embodiments, the method provides that the amount of time comprises an amount of digital audio samples.

In some embodiments, the method provides that the information comprises a number and the number equals the amount of digital audio samples.

In some embodiments, the method provides, before the first time, acoustically transmitting two synchronization signals for receiver synchronization, wherein a time period separating the transmission of the two synchronization signals is known to a receiver system.

In some embodiments, the two synchronization signals comprise two instances of the signal.

In some embodiments, the method provides identifying second information for acoustic transfer, determining a second amount of time corresponding to the second information, and, upon the second amount of time elapsing since the second time, acoustically transmitting the signal at a third time.

In some embodiments, the method provides that the signal comprises frequencies audible to the human ear.

In another embodiment, a receiver system for acoustically receiving information is provided. The system includes an acoustic receiver configured to receive a signal at a first time and, after the first time, receive the signal at a second time. The system also includes a processing system configured to derive information based on a time period between the first time and the second time.

In some embodiments, the processing system configured to derive information based on a time period between the first time and the second time comprises the processing system configured to determine a correlation between the signal transmitted at the first time and the signal transmitted at the second time, determine the time period as a time between peaks resulting from the correlation, and identify the information that corresponds to the time period.

In some embodiments, the acoustic receiver is configured to, before the first time, receive two synchronization signals for receiver synchronization, wherein a time period separating the transmission of the two synchronization signals is known to the receiver system.

In some embodiments, the acoustic receiver is configured to receive the signal at a third time after the second time and the processing system is configured to derive second information based on a second time period between the second time and the third time.

In yet another embodiment, a transmitter system for acoustically transferring information is provided. The transmitter system includes a processing system configured to identify information for acoustic transfer and determine an amount of time corresponding to the information. The transmitter system further includes an acoustic transmitter configured to acoustically transmit a signal at a first time and, upon the amount of time elapsing since the first time, acoustically transmit the signal at a second time.

In some embodiments, the acoustic transmitter is configured to acoustically transmit, before the first time, two synchronization signals for receiver synchronization, wherein a time period separating the transmission of the two synchronization signals is known to a receiver system.

In some embodiments, the processing system configured to identify second information for acoustic transfer and determine a second amount of time corresponding to the second information and the acoustic transmitter is configured to, upon the second amount of time elapsing since the second time, acoustically transmit the signal at a third time.

BRIEF DESCRIPTION OF THE DRAWINGS

FIG. 1 illustrates an acoustic information transfer system.

FIG. 2 illustrates an operation of the acoustic information transfer system.

FIG. 3 illustrates an operation of the acoustic information transfer system.

DETAILED DESCRIPTION

Figure 4:
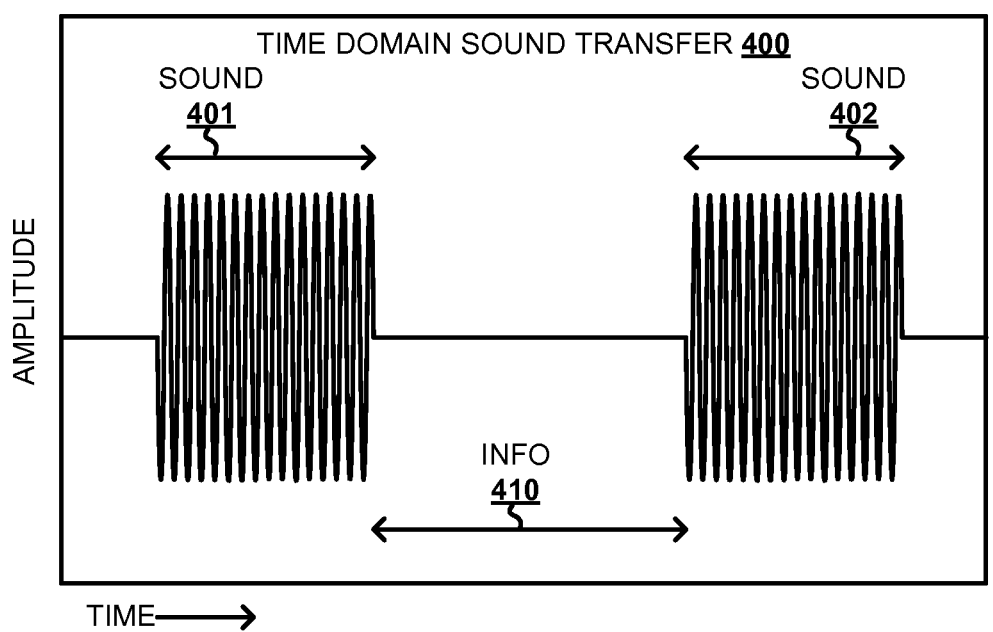
FIG. 4 illustrates acoustically transmitted signals in an operation of the acoustic information transfer system.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates acoustic information transfer system 100. Acoustic information transfer system 100 includes acoustic transmitter system 101 and acoustic receiver system 102. Acoustic transmitter system 101 and acoustic transmitter system 102 communicate over acoustic communication link 110.

In operation, acoustic transmitter system 101 and acoustic receiver system 102 are devices, or incorporated into devices, that share a relatively small amount of information. The information may be information of the sort that could be exchanged using near field communication (NFC). However, NFC would typically require systems 101 and 102 to be within a few inches of each other in order for the information to be transferred. In contrast, while acoustically transferring the information still requires that receiver system 102 be within acoustic signal range of transmitter 101 (e.g. within the same room), acoustic transfer can occur at distances greater than those allowed by NFC.

FIG. 2 illustrates an operation of acoustic information transfer system 100. The operation provides identifying information 121 for acoustic transfer (step 200) and determining an amount of time corresponding to the information (step 202). The operation further provides acoustically transmitting a signal at a first time (step 204) and, upon the amount of time elapsing since the first time, acoustically transmitting the signal at a second time (step 206).

Using the method described above, acoustic transmitter system 101 essentially encodes information 121 into the amount of time between transmitting the two signals rather than encoding information 121 into one or both of the signals. Thus, the correspondence between various amounts of time and various items of information are known by both transmitter system 101 and receiver system 102 for encoding and decoding information from the transmitted signals. For example, each discrete amount of time that the system is configured to use may correspond to a number, a character, a set of characters, or any other type of information to which a particular amount of time could correspond. Information 121 itself may be generated by an application executing on acoustic transmitter system 101, input into transmitter system 101 by a user, received by transmitter system 101 over a communication network, or any other means by which information may become available to transmitter system 101—including combinations thereof.

FIG. 3 illustrates another operation of acoustic information transfer system 100. The operation provides receiving the signal transmitted at the first time in the method of FIG. 2 (step 300). The signal transmitted at the second time is also received (step 302). The operation then provides deriving the information based on a time period between receipt of the signal transmitted at the first time and receipt of the signal transmitted at the second time (step 304).

In other words, the method of FIG. 3 provides that acoustic receiver system 102 receives the two signals transmitted by acoustic transmitter system 101 using the method of FIG. 2 over acoustic communication link 110. Receiver system 102 can then derive information 121 encoded in the time between the two signals since the time period between receipt of the two signals should be substantially similar to the amount of time between transmission of the two signals. Therefore, when acoustic transmitter system 101 transmits two acoustic signals separated by an amount of time corresponding to information 121, the time period between receipt of each of those two signals by acoustic receiver system 102 is an amount of time that also corresponds to information 121.

The difference between discrete time intervals used to differentiate items of information are preferably chosen to be long enough to ensure information 121 is properly derived by receiver system 102. Thus, the thresholds for the discrete time intervals are spaced far enough apart to account for error that may occur when identifying the time period between the two received signals.

In the above embodiments, the signal transmitted at the first time is identical to the signal transmitted at the second time. Accordingly, acoustic receiver system 102 need only recognize identical signals without needing to know in advance which signals should be recognized.

In some embodiments, the signal is generated to be a noise-like signal that is relatively inoffensive to the human ear. Specifically, the energy of the signal may be focused in the 6-12 kHz frequency band. Human hearing sensitivity in the 6-12 kHz band relatively low compared to the 0.5-5 kHz range. The signal envelope may therefore form a continuous bell shape across the 6-12 kHz band and across the duration of the signal in the time domain. Additionally, the time length of the signal may be in the range of 20-200 milliseconds so as to be as unobtrusive to other sounds, such as speech, as possible.

Advantageously, encoding information 121 into the time between two acoustic signals (e.g. sounds or tones) helps prevent interference from other sounds and noises on acoustic link 110 from affecting the ability of receiver system 102 to decode information 121. In particular, two acoustic signals that are acoustically transmitted within a short amount of time (e.g. within 1 or 2 seconds of each other), should both be subject to substantially the same acoustic interference on link 110. Thus, while interference may change two received signals that were transmitted as identical signals, those received signals should still look substantially identical to each other even if not identical to the signals as transmitted.

In a particular use case example of the above embodiments, acoustic transmitter system 101 is part of a user's smartphone that has the capability of directing various meeting room systems, such as audio/visual or conferencing systems, within a meeting room via an application executing on the smartphone. The smartphone indicates to a centralized server over a cellular or WIFI network link that the user wishes to control the systems in the meeting room. That server transfers a code, such as 1472, back to the smartphone. The smartphone then determines an amount of time corresponding to the number 1472 and instructs the speaker of the smartphone to play an audible signal, wait the determined amount of time, and then play the audible signal again.

Acoustic receiver system 102 is placed in the meeting room as well and is incorporated into or in communication with a controller of the meeting room systems. Acoustic receiver system 102 monitors for sounds within the meeting room. Specifically, acoustic receiver system 102 monitors for sounds transferred from devices like the user's smartphone from among the other noises that occur within the meeting room, such as talking, paper rustling, cellphone rings, or other sounds. Once the two sounds are recognized, acoustic receiver system 102 determines the time period between those two tones being captured (i.e. received). From that time period, receiver system 102 derives the number 1472 and uses this number to query the centralized server that originally provided the number.

The centralized server now knows that both the user's smartphone and the meeting room system controller are associated with the same 1472 number. In other words, the meeting room controller knowledge of the 1472 number indicates to the server that the smartphone is requesting access to that particular controller as opposed to other controllers that may be serviced by the server. Additionally, the fact that the smartphone would have to be located in the same meeting room as the meeting room controller in order to transfer the acoustic tones indicates that the smartphone is not attempting to control the meeting room from another location. The server therefore is able to facilitate the smartphone's control of the meeting room systems over communication networks.

Referring back to FIG. 1, acoustic transmitter system 101 comprises processing circuitry and an acoustic transmitter element. The acoustic transmitter element may comprise a speaker or some other mechanism capable of generating an acoustic signal—including combinations thereof. The processing circuitry is configured to direct the acoustic output of the acoustic transmitter element. Acoustic transmitter system 101 may also include a user interface, memory device, software, RF communication circuitry, wired communication circuitry, or some other communication or computing components. Acoustic transmitter system 101 may be (or may be incorporated into) a telephone, computer, tablet, e-book, mobile Internet appliance, media player, game console, or some other computing apparatus—including combinations thereof.

Acoustic receiver system 102 comprises processing circuitry and an acoustic receiver element. The acoustic receiver element may comprise a microphone or some other mechanism capable of capturing an acoustic signal—including combinations thereof. The processing circuitry is configured to process acoustic signals received by the acoustic receiver element. Acoustic receiver system 102 may also include a user interface, memory device, software, RF communication circuitry, wired communication circuitry, or some other communication or computing components. Acoustic receiver system 102 may be (or may be incorporated into) a room control system, telephone, computer, tablet, e-book, mobile Internet appliance, media player, game console, or some other computing apparatus—including combinations thereof.

Acoustic communication link 110 comprises any medium over which an acoustic signal can be transferred. Typically, acoustic signals may be propagated to some extent through gases, liquids, and solids—including combinations thereof. However, in a typical example, acoustic communication link 110 would comprise air making up the space between acoustic transmitter system 101 and acoustic receiver system 102.

Figure 8:
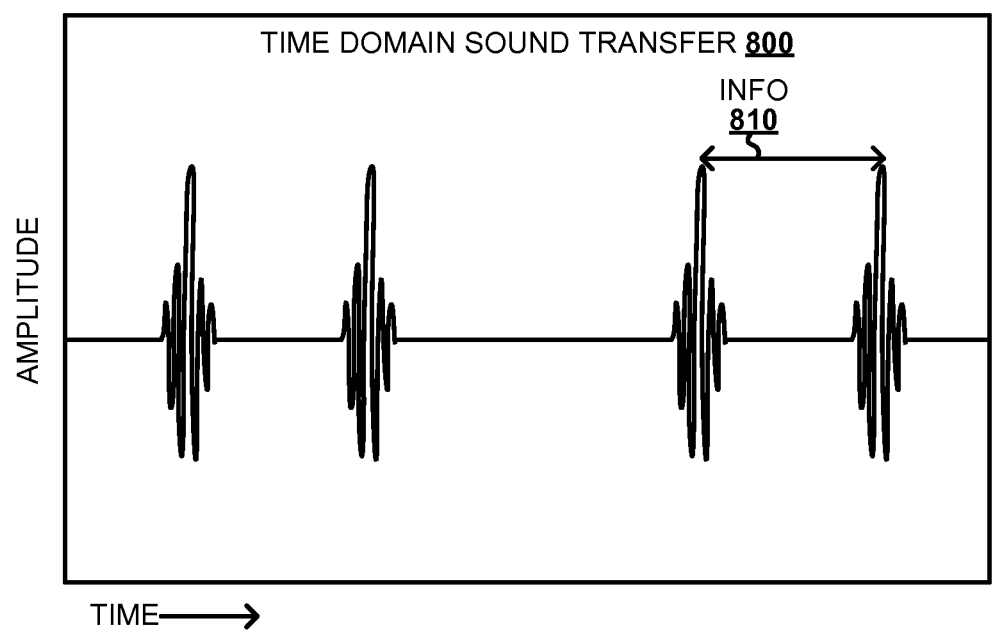
FIG. 8 illustrates correlated acoustically transmitted signals in an operation of the acoustic information receiver system.

FIG. 4 illustrates a time domain representation of acoustic signals transmitted by an acoustic transmitter system. Time domain sound transfer representation 400 illustrates acoustic signals transmitted over an acoustic link. In particular, representation 400 shows that sound 401 is transferred first and then, after an amount of time, sound 402 is transferred. While the acoustic signals of representation 400 comprise sounds 401 and 402 being identical single frequency sounds for simplicity of explanation, the sounds could be more complex and include many more frequency components or, preferably, comprise a noise-like signal. In fact, the randomness of a noise-like signal is what will ensure the distinct peaks as illustrated in FIG. 8 and discussed in more detail below. Likewise, sounds 401-402 may include frequencies and last long enough so as they are audible to the human ear.

Information 410 is encoded into the time between sound 401 and sound 402. While information 410 shown on representation 400 corresponds to the time measured from the end of sound 401 to the beginning of sound 402, the corresponding time may be measured from other points as long as both the transmitter and receiver are using the same convention. For example, the time could be measured from the beginning of sound 401 to the end of sound 402, from the midpoint of sound 401 to the midpoint of sound 402, from the end of sound 401 to the end of sound 402, or some other reference from which the time could be measured.

In some embodiments, though not shown, additional information may be encoded into the time between subsequent sounds. For example, a third sound may be transferred after sound 402. Another item of information may be encoded into the time between sound 402 and the third sound in the same manner that information 410 was encoded into the time between sound 401 and sound 402.

Figure 5:
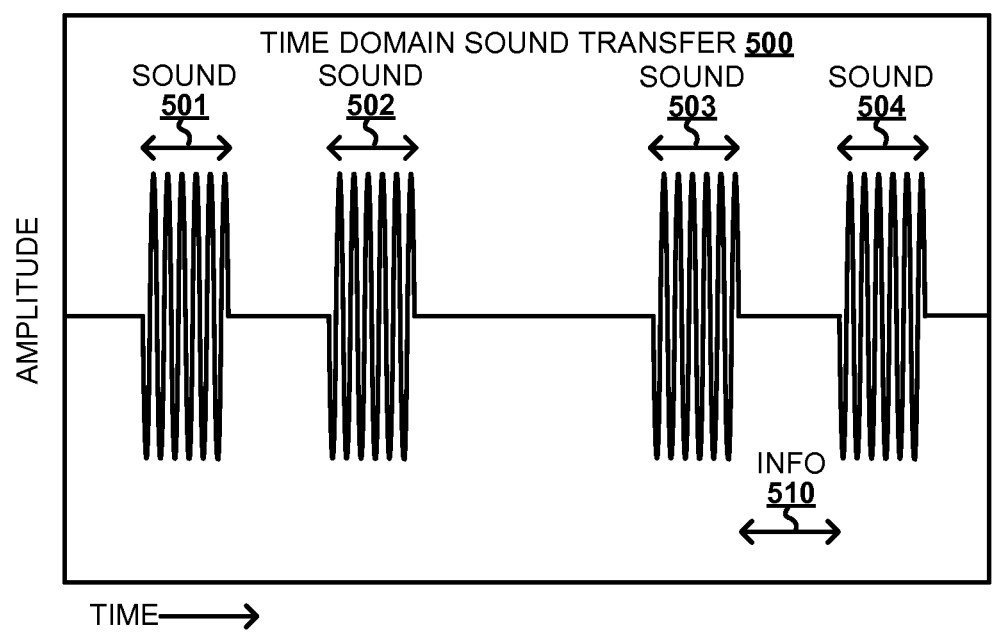
FIG. 5 illustrates acoustically transmitted signals in an operation of the acoustic information transfer system.

FIG. 5 illustrates another time domain representation of acoustic signals transmitted by an acoustic transmitter system. Time domain sound transfer representation 500 illustrates acoustic signals transmitted over an acoustic link. In particular, representation 500 shows that four identical sounds 501-504 are transferred in succession. While the acoustic signals of representation 500 comprise sounds 501-504 being identical single frequency sounds for clarity of illustration, the sounds in this example are more complex noise-like signals and, therefore, include many more random frequency components. The randomness of the sounds allows for the peaks discussed below. Likewise, sounds 501-504 may include frequencies and last long enough so as they are audible to the human ear.

In this embodiment, sounds 501 and 502 are transferred as synchronization sounds. Once an acoustic receiver recognizes the two synchronization sounds 501 and 502, the receiver knows that the next two sounds it receives will be the sounds 503 and 504 that have information 510 encoded there between. A specific use of the synchronization sounds is described below with respect to FIGS. 6 and 7. While synchronization sounds are identical sounds in this example, the synchronization sounds may be different than sounds 503 and 504 as long as the time spacing between sounds 501 and 502 is known to the acoustic receiver.

Figure 6:
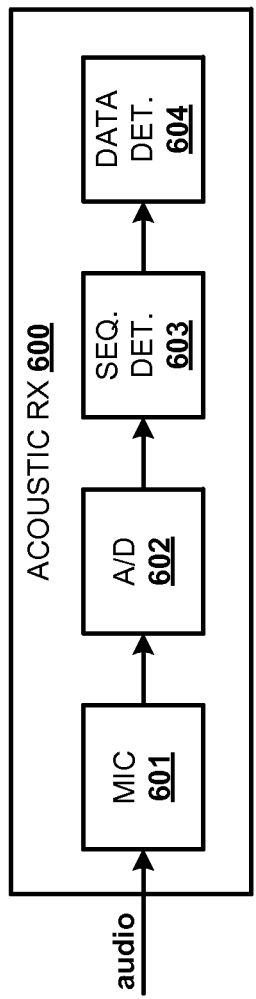
FIG. 6 illustrates an acoustic information receiver system.

FIG. 6 illustrates an acoustic information receiver system 600. Acoustic information receiver system 600 includes microphone 601, analog to digital converter 602, sequence detector 603, and data detector 604. Sequence detector 603 and data detector 604 may comprise purpose built hardware processing circuitry or, either or both, may comprise computer instructions executing on a general processing system. It should be understood that, while receiver system 600 converts analog signals to digital signals, the functionality of receiver system 600 could be implemented using only analog components.

Figure 7:
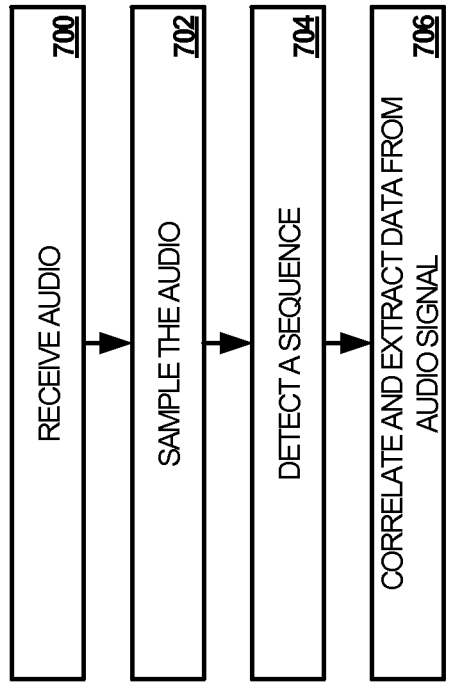
FIG. 7 illustrates an operation of the acoustic information receiver system.

FIG. 7 illustrates an operation of acoustic information receiver system 600. Microphone 601 receives audio from the location in which system 600 is placed (step 700). A/D 602 samples the received analog audio signal for further processing as a digital audio signal (step 702). The sampled signal is then processed by sequence detector 603 to identify a sequence of synchronization sounds (step 704). Once the synchronization sounds are identified, the sampled audio received after the synchronization sounds is processed by data detector 604 to extract data from the time separating the following sounds (step 706).

In some embodiments, the audio processed by sequence detector 603 is sampled at a lower sampling rate than the audio processed by data detector 604 because the resolution needed to detect the sounds does not need to be as high as the resolution needed to properly extract data.

Using signal representation 500 from FIG. 5, sequence detector 603 knows how far apart identical sounds 501 and 502 should be spaced (e.g. 0.25 seconds). Therefore, sequence detector 603 is able to detect the receipt of sounds 501 and 502 from amongst other received sound. To do this, an autocorrelation is performed on the received audio. The receipt of sound 501 will cause the autocorrelation to result in a salient peak that identifies sound 501 to the sequence detector 603. Sequence detector then uses sound 501 to cross correlate with the subsequent received audio and is able to detect a peak from sound 502. These two peaks can be seen in FIG. 8 in the positions corresponding to the positions of sounds 501 and 502 in FIG. 5. The correlation of sound 501 with sound 502 should provide a peak similar to the autocorrelation of sound 501 because sound 502 is an identical signal and subject to substantially identical transmission interference as did sound 501. It should be understood that sound 502 and sounds 503-504 may still be considered identical even though each sound may have opposite phases to sound 501.

Once sounds 501 and 502 have been detected, sequence detector 603 also knows how long after receipt of sounds 501 and 502 the first sound, sound 503, used to calculate the data should be received (e.g. 0.5 seconds). Therefore, the audio is sampled at a higher rate from the time sound 503 is supposed to be received through the receipt of sound 504.

Since the time of sound 503's receipt is known from the two synchronization signals 501 and 502, data detector 604 does not need to filter the received audio to determine the receipt of sound 503. Data detector 604 cross correlates sound 503 with subsequent received audio to identify sound 504 and product the third and the fourth peak shown in FIG. 8. Since sounds 503 and 504 are cross correlated, sounds 503 and 504 can but need not be identical to sounds 501 and 502. The processing above may be done after the audio for the sounds has been captured rather than in real time as the sounds are received. Data detector 604 derives information 810 by determining the number of digital audio samples that were taken between the peaks of the autocorrelation for sound 503 and the autocorrelation for sound 504.

For example, if the number of samples representing information 810 is 5,482, then information 810 corresponds to 5,482. 5,482 itself may be the information intended to be received by acoustic receiver system 600, or system 600 may do further processing to determine what data the number 5,482 is supposed to represent. Therefore, in order for information to be derived using the above scheme, the acoustic transmitter and receiver must both be aware of the receivers sampling rate so that the time spacing on the transmitted sounds To accomplish peak detection described above, data detector 604 may smooth each autocorrelation using low-pass filtering. After smoothing, data detector 604 detects the maximum by first finding the maximum value from a segment of samples surrounding a particular sample (i.e. the neighborhood of the sample) and its maximum value is compared to the sample. In other examples, double window averaging may be used to identify the peaks.

Figure 9:
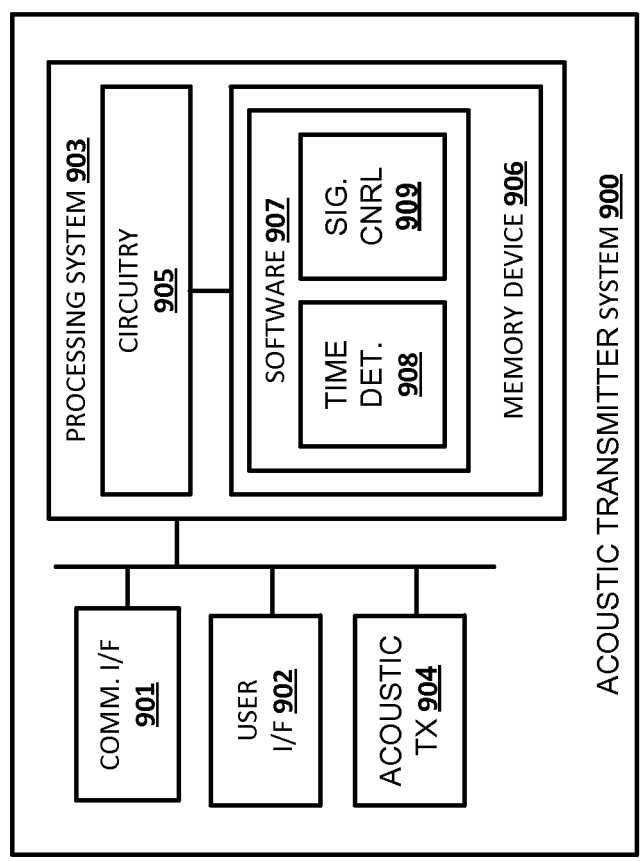
FIG. 9 illustrates an acoustic information transmitter system.

FIG. 9 illustrates acoustic transmitter system 900. Acoustic transmitter system 900 is an example of acoustic transmitter system 101, although system 101 could use alternative configurations. Acoustic transmitter system 900 comprises wireless communication interface 901, user interface 902, processing system 903, and acoustic transmitter 904. Processing system 903 is linked to wireless communication interface 901, user interface 902, and acoustic transmitter 904. Processing system 903 includes processing circuitry 905 and memory device 906 that stores operating software 907. Acoustic transmitter system 900 may include other well-known components such as a battery and enclosure that are not shown for clarity. Acoustic transmitter system 900 may be a telephone, tablet, computer, e-book, mobile Internet appliance, media player, game console, wireless network interface card, or some other wireless communication apparatus—including combinations thereof.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof. Communication interface 901 may be omitted in some examples.

User interface 902 comprises components that interact with a user to receive user inputs and to present media and/or information. User interface 902 may include a speaker, microphone, buttons, lights, display screen, touch screen, touch pad, scroll wheel, communication port, or some other user input/output apparatus—including combinations thereof. User interface 902 may be omitted in some examples.

Acoustic transmitter 904 comprises components capable of generating acoustic signals. Acoustic transmitter 904 may include a speaker or other sound-generating element. Though shown separately, acoustic transmitter 904 may be part of user interface 902.

Processing circuitry 905 comprises microprocessor and other circuitry that retrieves and executes operating software 907 from memory device 906. Memory device 906 comprises a non-transitory storage medium, such as a disk drive, flash drive, data storage circuitry, Random Access Memory (RAM), or some other memory apparatus—including combinations thereof. Processing circuitry 905 is typically mounted on a circuit board that may also hold memory device 906 and portions of communication interface 901 and user interface 902. Operating software 907 comprises computer programs, firmware, or some other form of machine-readable processing instructions. Operating software 907 includes time determination module 908 and signal control module 909. Operating software 907 may further include an operating system, utilities, drivers, network interfaces, applications, or some other type of software. When executed by processing circuitry 905, operating software 907 directs processing system 903 to operate acoustic transmitter system 900 as described herein.

In particular, time determination module 908 directs processing system 903 to identify information for acoustic transfer and determine an amount of time corresponding to the information. Signal control module 909 directs processing system 903 to acoustically transmit a signal via acoustic transmitter 904 at a first time and, upon the amount of time elapsing since the first time, acoustically transmit the signal via acoustic transmitter 904 at a second time.

Figure 10:
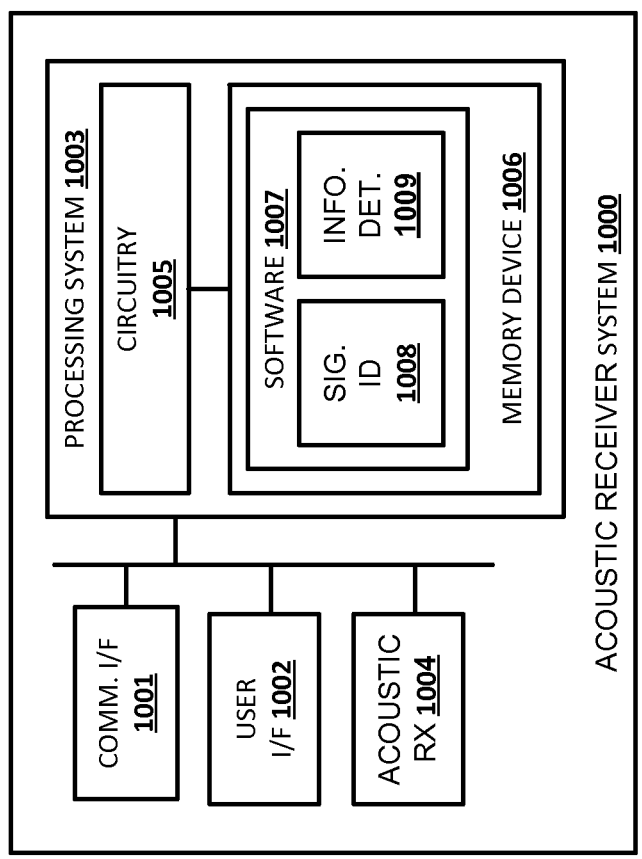
FIG. 10 illustrates an acoustic information receiver system.

FIG. 10 illustrates acoustic receiver system 1000. Acoustic receiver system 1000 is an example of acoustic receiver system 102, although system 102 could use alternative configurations. Acoustic receiver system 1000 comprises wireless communication interface 1001, user interface 1002, processing system 1003, and acoustic receiver 1004. Processing system 1003 is linked to wireless communication interface 1001, user interface 1002, and acoustic receiver 1004. Processing system 1003 includes processing circuitry 1005 and memory device 1006 that stores operating software 1007. Acoustic receiver system 1000 may include other well-known components such as a battery and enclosure that are not shown for clarity. Acoustic receiver system 1000 may be a telephone, tablet, computer, e-book, mobile Internet appliance, media player, game console, wireless network interface card, or some other wireless communication apparatus—including combinations thereof.

Communication interface 1001 comprises components that communicate over communication links, such as network cards, ports, RF transceivers, processing circuitry and software, or some other communication devices. Communication interface 1001 may be configured to communicate over metallic, wireless, or optical links. Communication interface 1001 may be configured to use TDM, IP, Ethernet, optical networking, wireless protocols, communication signaling, or some other communication format—including combinations thereof. Communication interface 1001 may be omitted in some examples.

User interface 1002 comprises components that interact with a user to receive user inputs and to present media and/or information. User interface 1002 may include a speaker, microphone, buttons, lights, display screen, touch screen, touch pad, scroll wheel, communication port, or some other user input/output apparatus—including combinations thereof. User interface 1002 may be omitted in some examples.

Acoustic receiver 1004 comprises components capable of capturing acoustic signals. Acoustic receiver 1004 may include a microphone or other acoustic signal element. Though shown separately, acoustic receiver 1004 may be part of user interface 1002.

Processing circuitry 1005 comprises microprocessor and other circuitry that retrieves and executes operating software 1007 from memory device 1006. Memory device 1006 comprises a non-transitory storage medium, such as a disk drive, flash drive, data storage circuitry, Random Access Memory (RAM), or some other memory apparatus—including combinations thereof. Processing circuitry 1005 is typically mounted on a circuit board that may also hold memory device 1006 and portions of communication interface 1001 and user interface 1002. Operating software 1007 comprises computer programs, firmware, or some other form of machine-readable processing instructions. Operating software 1007 includes signal identification module 1008 and information determination module 1009. Operating software 1007 may further include an operating system, utilities, drivers, network interfaces, applications, or some other type of software. When executed by processing circuitry 1005, operating software 1007 directs processing system 1003 to operate acoustic receiver system 1000 as described herein.

In particular, signal identification module 1008 directs processing system 1003 to identify a signal received via acoustic receiver 1004 at a first time and the signal received via acoustic receiver 1004 at a second time after the first time. Information determination module 1009 directs processing system 1003 to derive information based on a time period between the first time and the second time.

It should be understood that, while the embodiments described with respect to FIGS. 1-10 above apply to acoustic signals, either audible or inaudible, the same technique may be used for transmitting signals in other mediums, such as Radio Frequency signals.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of acoustically transferring information, comprising:
   identifying information for acoustic transfer;
   determining an amount of time corresponding to the information;
   acoustically transmitting a signal at a first time;
   upon the amount of time elapsing since the first time, acoustically transmitting the signal at a second time
   receiving the signal transmitted at the first time and the signal transmitted at the second time;
   determining a correlation between the signal transmitted at the first time and the signal transmitted at the second time;
   determining a time period as a time between peaks resulting from the correlation; and
   identifying the information that corresponds to the time period.

2. The method of claim 1, wherein the amount of time comprises an amount of digital audio samples.

3. The method of claim 2, wherein the information comprises a number and the number equals the amount of digital audio samples.

4. The method of claim 1, further comprising:
   before the first time, acoustically transmitting two synchronization signals for receiver synchronization, wherein a time period separating the transmission of the two synchronization signals is known to a receiver system.

5. The method of claim 4, wherein the two synchronization signals comprise two instances of the signal.

6. The method of claim 1, further comprising:
   identifying second information for acoustic transfer;

determining a second amount of time corresponding to the second information; and upon the second amount of time elapsing since the second time, acoustically transmitting the signal at a third time.

7. The method of claim 1, wherein the signal comprises frequencies audible to the human ear.

8. A receiver system for acoustically receiving information, comprising:

an acoustic receiver configured to receive a signal at a first time and, after the first time, receive the signal at a second time; and a processing system configured to:
determine a correlation between the signal transmitted at the first time and the signal transmitted at the second time;
determine a time period as a time between peaks resulting from the correlation; and
identify the information that corresponds to the time period.

9. The receiver system of claim 8, wherein the time period comprises an amount of digital audio samples.

10. The receiver system of claim 9, wherein the information comprises a number and the number equals the amount of digital audio samples.

11. The receiver system of claim 8, further comprising:
the acoustic receiver configured to, before the first time, receive two synchronization signals for receiver synchronization, wherein a time period separating the transmission of the two synchronization signals is known to the receiver system.

12. The receiver system of claim 8, further comprising:
the acoustic receiver configured to receive the signal at a third time after the second time;
the processing system configured to derive second information based on a second time period between the second time and the third time.

13. A transmitter system for acoustically transferring information, comprising:

a processing system configured to identify information for acoustic transfer and determine an amount of time corresponding to the information;

an acoustic transmitter configured to acoustically transmit a signal at a first time and, upon the amount of time elapsing since the first time, acoustically transmit the signal at a second time; and wherein a receiver receives the signal transmitted at the first time and the signal transmitted at the second time, determines a correlation between the signal transmitted at the first time and the signal transmitted at the second time, determines a time period as a time between peaks resulting from the correlation, and identifies the information that corresponds to the time period.

14. The transmitter system of claim 13, wherein the amount of time comprises an amount of digital audio samples.

15. The transmitter system of claim 14, wherein the information comprises a number and the number equals the amount of digital audio samples.

16. The transmitter system of claim 13, further comprising:
the acoustic transmitter configured to acoustically transmit, before the first time, two synchronization signals for receiver synchronization, wherein a time period separating the transmission of the two synchronization signals is known to a receiver system.

17. The transmitter system of claim 13, further comprising:
the processing system configured to identify second information for acoustic transfer and determine a second amount of time corresponding to the second information; and
the acoustic transmitter configured to, upon the second amount of time elapsing since the second time, acoustically transmit the signal at a third time.

* * * * *